US010796303B2

(12) United States Patent
Dutta et al.

(10) Patent No.: US 10,796,303 B2
(45) Date of Patent: Oct. 6, 2020

(54) SYSTEM, METHOD, AND COMPUTER PROGRAM PRODUCT FOR PREDICTING PAYMENT TRANSACTIONS USING A MACHINE LEARNING TECHNIQUE BASED ON MERCHANT CATEGORIES AND TRANSACTION TIME DATA

(71) Applicant: Visa International Service Association, San Francisco, CA (US)

(72) Inventors: Amitava Dutta, Singapore (SG); April Pabale Vergara, Singapore (SG); Suresh Krishna Vaidyanathan, Singapore (SG)

(73) Assignee: Visa International Service Association, San Francisco, CA (US)

( * ) Notice: Subject to any disclaimer, the term of this patent is extended or adjusted under 35 U.S.C. 154(b) by 612 days.

(21) Appl. No.: 15/696,447

(22) Filed: Sep. 6, 2017

(65) Prior Publication Data
US 2019/0073669 A1    Mar. 7, 2019

(51) Int. Cl.
*G06Q 30/00* (2012.01)
*G06Q 20/40* (2012.01)
(Continued)

(52) U.S. Cl.
CPC ............ *G06Q 20/40* (2013.01); *G06N 5/048* (2013.01); *G06N 7/005* (2013.01); *G06N 20/00* (2019.01);
(Continued)

(58) Field of Classification Search
CPC .... G06Q 20/40; G06Q 20/405; G06Q 20/401; G06Q 20/4016; G06Q 20/206;
(Continued)

(56) References Cited

U.S. PATENT DOCUMENTS 5,572,221 A * 11/1996 Marlevi ................ H04W 28/18
342/452
6,185,558 B1 * 2/2001 Bowman ................ G06Q 30/02
705/37
(Continued)

FOREIGN PATENT DOCUMENTS

EP       1050833 A2 * 11/2000   ......... G06Q 30/0269

OTHER PUBLICATIONS

Hansotia, Brenham. "Marketing by Objectives: Using Segmentation based on purchase timing to enhance customer equity." Journal of Direct Data and Digital Marketing Practice, vol. 10, No. 4, pp. 336-355, 2009. (Year: 2009).*
(Continued)

*Primary Examiner* — Luis A Brown
(74) *Attorney, Agent, or Firm* — The Webb Law Firm

(57) ABSTRACT

Provided is a computer-implemented method for predicting payment transactions using a machine learning technique that includes receiving transaction data, generating a categorical transaction model based on the transaction data, determining a plurality of prediction scores including determining, for one or more users, a prediction score in each merchant category of a plurality of merchant categories for each predetermined time segment of a plurality of predetermined time segments, where a respective prediction score includes a prediction of whether a user will conduct a payment transaction in a merchant category at a time associated with a predetermined time segment associated with the respective prediction score, determining a recommended merchant category and a recommended predetermined time segment of at least one offer, generating the at least one offer, and communicating the at least one offer to the one or more users. A system and computer program product are also disclosed.

20 Claims, 5 Drawing Sheets

(51) Int. Cl.
| | |
|---|---|
| G06Q 20/20 | (2012.01) |
| G06Q 20/34 | (2012.01) |
| G06Q 30/02 | (2012.01) |
| G06N 7/00 | (2006.01) |
| G06N 5/04 | (2006.01) |
| G06N 20/00 | (2019.01) |
| G07F 7/06 | (2006.01) |
| G06Q 10/06 | (2012.01) |

(52) U.S. Cl.
CPC ............ *G06Q 20/206* (2013.01); *G06Q 20/34* (2013.01); *G06Q 20/401* (2013.01); *G06Q 20/405* (2013.01); *G06Q 20/4016* (2013.01); *G06Q 30/0254* (2013.01); *G06Q 30/0261* (2013.01); *G07F 7/0609* (2013.01); *G06Q 10/067* (2013.01); *G06Q 30/0215* (2013.01); *G06Q 30/0238* (2013.01)

(58) Field of Classification Search
CPC ............... G06Q 20/34; G06Q 30/0254; G06Q 30/0261; G06Q 10/067; G06Q 30/0238; G06Q 30/0215; G07F 7/0609; G06N 20/00; G06N 7/005; G06N 5/048
USPC ............. 705/14.4, 14.49, 14.52, 14.53, 14.66
See application file for complete search history.

(56) References Cited

U.S. PATENT DOCUMENTS

| | | | | |
|---|---|---|---|---|
| 6,343,317 B1* | 1/2002 | Glorikian | G06F 16/9537 709/218 |
| 6,430,539 B1* | 8/2002 | Lazarus | G06Q 30/02 705/14.1 |
| 6,438,579 B1* | 8/2002 | Hosken | G06Q 30/02 709/203 |
| 6,484,148 B1* | 11/2002 | Boyd | G06Q 30/02 340/8.1 |
| 6,571,279 B1* | 5/2003 | Herz | G06Q 30/02 709/217 |
| 6,782,370 B1* | 8/2004 | Stack | G06Q 30/02 705/26.1 |
| 7,228,155 B2* | 6/2007 | Saunders | G06Q 20/20 379/114.19 |
| 7,594,189 B1* | 9/2009 | Walker | G06F 16/9535 715/811 |
| 7,890,367 B2* | 2/2011 | Senghore | B01J 23/6562 705/14.28 |
| 7,921,069 B2* | 4/2011 | Canny | G06Q 30/02 706/47 |
| 8,061,593 B1* | 11/2011 | Graef | G06Q 20/1085 235/379 |
| 8,359,239 B1* | 1/2013 | Cook | G06Q 30/04 705/16 |
| 8,738,421 B1* | 5/2014 | Ali | G06Q 30/0223 705/28 |
| 2001/0014868 A1* | 8/2001 | Herz | G06Q 30/02 705/14.38 |
| 2001/0036224 A1* | 11/2001 | Demello | H04L 63/30 375/220 |
| 2002/0050927 A1* | 5/2002 | De Moerloose | H04W 4/029 340/539.1 |
| 2002/0077130 A1* | 6/2002 | Owensby | H04L 67/18 455/466 |
| 2003/0087652 A1* | 5/2003 | Simon | H04L 67/28 455/466 |
| 2003/0208754 A1* | 11/2003 | Sridhar | H04N 21/25841 725/34 |
| 2003/0212760 A1* | 11/2003 | Chen | G06F 16/954 709/218 |
| 2004/0006510 A1* | 1/2004 | Lertzman | G06Q 30/0258 705/14.52 |
| 2004/0034570 A1* | 2/2004 | Davis | G06Q 30/0601 705/7.31 |
| 2005/0278211 A1* | 12/2005 | Adams | G06Q 30/0242 705/14.41 |
| 2006/0064346 A1* | 3/2006 | Steenstra | H04L 67/18 705/14.64 |
| 2006/0271552 A1* | 11/2006 | McChesney | G06Q 30/02 |
| 2007/0010942 A1* | 1/2007 | Bill | G01C 21/3617 701/424 |
| 2007/0061317 A1 | 3/2007 | Ramer et al. | |
| 2007/0162341 A1* | 7/2007 | McConnell | G06Q 30/0267 705/14.38 |
| 2007/0233729 A1* | 10/2007 | Inoue | G06Q 30/0224 |
| 2007/0260635 A1 | 11/2007 | Ramer et al. | |
| 2007/0265984 A1* | 11/2007 | Santhana | G06Q 20/223 705/65 |
| 2007/0282684 A1* | 12/2007 | Prosser | G06Q 30/02 705/14.54 |
| 2008/0004888 A1* | 1/2008 | Davis | G06Q 20/3224 705/26.1 |
| 2008/0270250 A1* | 10/2008 | Bolivar | G06Q 40/04 705/26.1 |
| 2008/0288354 A1* | 11/2008 | Flinn | G06N 20/00 705/14.53 |
| 2009/0006363 A1* | 1/2009 | Canny | G06Q 30/02 |
| 2009/0248533 A1* | 10/2009 | Colemen | G06Q 30/0601 705/26.1 |
| 2010/0030651 A1* | 2/2010 | Matotek | G06Q 30/06 705/17 |
| 2010/0114748 A1* | 5/2010 | Duke | G06Q 40/00 705/35 |
| 2010/0125492 A1 | 5/2010 | Lin et al. | |
| 2014/0006163 A1 | 1/2014 | Sengupta et al. | |
| 2014/0164062 A1* | 6/2014 | Wen | G06Q 30/0224 705/7.33 |
| 2014/0180811 A1* | 6/2014 | Boal | G06Q 30/0269 705/14.53 |
| 2014/0365301 A1* | 12/2014 | Rappoport | G06Q 30/0253 705/14.51 |
| 2015/0134413 A1* | 5/2015 | Deshpande | G06Q 30/0202 705/7.31 |
| 2015/0170175 A1* | 6/2015 | Zhang | H04M 15/44 705/7.33 |
| 2015/0220983 A1* | 8/2015 | Chauhan | G06Q 30/0255 705/14.53 |
| 2015/0220999 A1* | 8/2015 | Thornton | H04M 15/8011 705/14.66 |
| 2015/0324939 A1* | 11/2015 | Malaviya | G06Q 50/16 705/14.66 |
| 2015/0332284 A1* | 11/2015 | Unser | G06Q 30/0269 705/7.29 |
| 2015/0356575 A1* | 12/2015 | Hu | G06Q 30/0202 705/7.35 |
| 2016/0086222 A1* | 3/2016 | Kurapati | G06Q 30/0261 705/14.53 |
| 2016/0132908 A1* | 5/2016 | von Walstrom | G06Q 30/0255 705/7.25 |
| 2016/0189177 A1* | 6/2016 | Parpia | G06Q 30/0202 705/7.31 |
| 2017/0200192 A1* | 7/2017 | DeAngelo | G06Q 30/0255 |
| 2017/0300948 A1* | 10/2017 | Chauhan | G06Q 30/0201 |
| 2018/0150547 A1* | 5/2018 | Pallath | G06N 20/00 |
| 2018/0247354 A1* | 8/2018 | Pratt | G06Q 30/0607 |

OTHER PUBLICATIONS

Van den Poel, Dirk, et al. "Predicting On-Line Purchase Behaviour." European Journal of Operational Research, No. 166, pp. 557-575, 2005. (Year: 2004).*

Parkhimenka, Uladzimir et al. "Heuristic Approach to Online Purchase Prediction based on Internet Store Visitors Classification Using Data Mining Methods." IEEE Explore, 2017. (Year: 2017).*

Adomavicius et al., "Context-Aware Recommender Systems", http://ids.csom.umn.edu/faculty/gedas/NSFCareer/CARS-chapter-2010.pdf, 2009 (37 pages).

(56) References Cited

OTHER PUBLICATIONS

Lombardi et al., "Context and Customer Behavior in Recommendation", http://ids.csom.umn.edu/faculty/gedas/cars2009/LombardiEtAl-cars2009.pdf, 2009 (5 pages).

* cited by examiner

SYSTEM, METHOD, AND COMPUTER PROGRAM PRODUCT FOR PREDICTING PAYMENT TRANSACTIONS USING A MACHINE LEARNING TECHNIQUE BASED ON MERCHANT CATEGORIES AND TRANSACTION TIME DATA

BACKGROUND OF THE INVENTION

1. Field of the Invention

This invention relates generally to systems, devices, products, apparatus, and methods for predicting payment transactions using a machine learning technique and, in one particular embodiment, to a system, product, and method for predicting payment transactions using a machine learning technique based on a plurality of merchant categories and transaction time data.

2. Technical Considerations

An incentive program may be a formal scheme used to encourage a specific action or behavior by a person during a period of time. An incentive program may include a reward program associated with an account (e.g., a credit card account), where the user (e.g., a cardholder) may receive an offer from an entity (e.g., an entity associated with a credit card network, a transaction service provider, a financial institution that issued the credit card, and/or the like) that can be redeemed for a discount during a payment transaction (e.g., a purchase), free goods and/or services, money to be applied against a balance of the account, money to be received by the user, and/or the like. In some instances, the incentive program may include an offer based on points, coupons, and/or the like, where the offer includes terms that state that the user may receive a set value of points, a coupon, and/or the like, when the user conducts a payment transaction using the account issued by the financial institution. In this way, the financial institution may seek to encourage the user to make a purchase using the account issued by the financial institution, instead of using cash, instead of using a credit card account issued by another financial institution, and/or the like, by providing the user with such an offer.

However, a financial institution may communicate offers to a user and/or a group of users and the offers may be ineffective at encouraging the user and/or the group of users to conduct a payment transaction using a credit card issued by the financial institution. For example, the offers may be ineffective because the financial institution did not take into consideration that a user did not make purchases at a merchant in a particular merchant category, did not make purchases at a merchant in a particular merchant category during a time interval of a day, and/or the like. In another example, the offers may be ineffective at encouraging the user and/or the group of users to make a purchase using the credit card because the user and/or the group of users has received so many offers from the financial institution that an offer is ignored. In addition, by communicating offers that are ineffective, network resources may be wasted as compared to communicating fewer offers.

SUMMARY OF THE INVENTION

Accordingly, it is an object of the present invention to provide systems, devices, products, apparatus, and/or methods for predicting payment transactions using a machine learning technique based on merchant categories and transaction time data.

According to non-limiting embodiments, provided is a computer-implemented method for predicting payment transactions using a machine learning technique that comprises receiving, with at least one processor, transaction data, where the transaction data is associated with a plurality of payment transactions in a plurality of merchant categories, where the plurality of payment transactions involve a plurality of users; generating, with at least one processor, a categorical transaction model based on the transaction data; determining, with at least one processor, a plurality of prediction scores for one or more users of the plurality of users based on the at least one categorical transaction model and the transaction data, where determining the plurality of prediction scores comprises: determining, for the one or more users of the plurality of users, a prediction score in each merchant category of the plurality of merchant categories for each predetermined time segment of the plurality of predetermined time segments, where a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score.

The method may further include determining, with at least one processor, one or more recommended merchant categories and one or more recommended predetermined time segments of at least one offer that is to be communicated to the one or more users based on the prediction scores of the one or more users, where the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score; generating, with at least one processor, the at least one offer based on determining the one or more recommended merchant categories and the one or more recommended predetermined time segments of the at least one offer; and communicating, with at least one processor, the at least one offer to the one or more users based on generating the at least one offer.

According to non-limiting embodiments, provided is a system for predicting payment transactions using a machine learning technique that comprises at least one processor programmed or configured to: generate a categorical transaction model based on first transaction data, where the first transaction data is associated with a first plurality of payment transactions in a plurality of merchant categories, where the first plurality of payment transactions involves a plurality of users; determine a plurality of prediction scores for one or more users of the plurality of users based on the at least one categorical transaction model and second transaction data, where the second transaction data is associated with a second plurality of payment transactions in the plurality of merchant categories, and where the at least one processor, when determining the plurality of prediction scores, is programmed or configured to: determine, for the one or more users of the plurality of users, a prediction score in each merchant category of the plurality of merchant categories for each predetermined time segment of the plurality of predetermined time segments, where a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score.

In addition, the at least one processor is further programmed or configured to: determine one or more recommended merchant categories and one or more recommended predetermined time segments of at least one offer that is to be communicated to the one or more users based on the prediction scores of the one or more users, where the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score; generate the at least one offer based on determining the one or more recommended merchant categories and the one or more recommended predetermined time segments of the at least one offer; and communicate the at least one offer to the one or more users based on generating the at least one offer.

According to non-limiting embodiments, provided is a computer program product for predicting payment transactions using a machine learning technique, the computer program product comprising at least one non-transitory computer-readable medium including one or more instructions that, when executed by at least one processor, cause the at least one processor to: generate a categorical transaction model based on first transaction data, wherein the transaction data is associated with a plurality of payment transactions in a plurality of merchant categories, wherein the plurality of payment transactions involves a plurality of users; determine a plurality of prediction scores for the plurality of users based on the categorical transaction model and the transaction data, wherein the one or more instructions, that cause the at least one processor to determine the plurality of prediction scores, cause the at least one processor to: determine, for each user of the plurality of users, a prediction score in a merchant category of the plurality of merchant categories for a predetermined time segment of the plurality of predetermined time segments, wherein a respective prediction score comprises a prediction of whether a respective user of the plurality of users will conduct a payment transaction in the merchant category of the plurality of merchant categories associated with the respective prediction score, at a time associated with the predetermined time segment of the plurality of predetermined time segments associated with the respective prediction score.

In addition, the one or more instructions, when executed by the at least one processor, further cause the at least one processor to: determine a recommended merchant category and a recommended predetermined time segment of an offer that is to be communicated to a user of the plurality of users based on the prediction scores of the user, wherein the recommended merchant category and the recommended predetermined time segment of the at least one offer correspond to a merchant category and a predetermined time segment, respectively, that are determined to be associated with a prediction score for the user that satisfies a threshold prediction score; generate the offer based on determining the recommended merchant category and the recommended predetermined time segment of the offer; and communicate the offer to a user device of the user based on generating the offer.

Further embodiments or aspects are set forth in the following numbered clauses:

Clause 1: A computer-implemented method for predicting payment transactions using a machine learning technique, the method comprising: receiving, with at least one processor, transaction data, wherein the transaction data is associated with a plurality of payment transactions in a plurality of merchant categories, wherein the plurality of payment transactions involve a plurality of users; generating, with at least one processor, a categorical transaction model based on the transaction data; determining, with at least one processor, a plurality of prediction scores for one or more users of the plurality of users based on the at least one categorical transaction model and the transaction data, wherein determining the plurality of prediction scores comprises: determining, for the one or more users of the plurality of user, a prediction score in each merchant category of the plurality of merchant categories for each predetermined time segment of the plurality of predetermined time segments, wherein a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score; determining, with at least one processor, one or more recommended merchant categories and one or more recommended predetermined time segments of at least one offer that is to be communicated to the one or more users based on the prediction scores of the one or more users, wherein the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score; generating, with at least one processor, the at least one offer based on determining the one or more recommended merchant categories and the one or more recommended predetermined time segments of the at least one offer; and communicating, with at least one processor, the at least one offer to the one or more users based on generating the at least one offer.

Clause 2: The computer implemented method of clause 1, wherein the plurality of merchant categories comprise at least one of the following: a food and grocery merchant category, a restaurant merchant category, a fuel merchant category, or any combination thereof.

Clause 3: The computer implemented method of clauses 1 or 2, wherein the predetermined time segment comprises at least one of the following: a predetermined time of day segment, a predetermined day of a week segment, or any combination thereof.

Clause 4: The computer implemented method of any of clauses 1-3, wherein the predetermined time segment comprises a predetermined time of day segment, and wherein the predetermined time of day segment is a predetermined time of day segment of a plurality of predetermined time of day segments, wherein the predetermined day of a week segment is a predetermined day of a week segment of a plurality of predetermined day of a week segments, wherein the plurality of predetermined time of day segments comprises at least four time of day segments and wherein the plurality of predetermined day of the week segments comprises at least two predetermined day of the week segments.

Clause 5: The computer implemented method of any of clauses 1-4, further comprising: determining location data associated with a location of the one or more users; determining merchant identity data based on the location data associated with the location of the one or more users; and wherein communicating the at least one offer to the one or more users comprises: communicating the at least one offer to the one or more users based on the merchant identity data.

Clause 6: The computer implemented method of any of clauses 1-5, wherein communicating the at least one offer to the one or more users comprises: communicating, with at least one processor, the at least one offer to the one or more users at the time associated with the at least one predetermined time segment.

Clause 7: The computer implemented method of any of clauses 1-6, wherein the threshold prediction score comprises a highest prediction score for the one or more users in the one or more merchant categories of the plurality of merchant categories and the one or more predetermined time segments of the plurality of predetermined time segments.

Clause 8: The computer implemented method of any of clauses 1-7, wherein the threshold prediction score comprises 10% percent of a plurality of highest prediction scores for the plurality of users in the one or more merchant categories of the plurality of merchant categories and the one or more predetermined time segments of the plurality of predetermined time segments.

Clause 9: The computer implemented method of any of clauses 1-8, wherein the plurality of payment transactions comprises a plurality of card present payment transactions.

Clause 10: A system for predicting payment transactions using a machine learning technique, the system comprising: at least one processor programmed or configured to: generate a categorical transaction model based on first transaction data, wherein the first transaction data is associated with a first plurality of payment transactions in a plurality of merchant categories, wherein the first plurality of payment transactions involve a plurality of users; determine a plurality of prediction scores for one or more users of the plurality of users based on the at least one categorical transaction model and second transaction data, wherein the second transaction data is associated with a second plurality of payment transactions in the plurality of merchant categories, and wherein the at least one processor, when determining the plurality of prediction scores, is programmed or configured to: determine, for the one or more users of the plurality of users, a prediction score in each merchant category of the plurality of merchant categories for each predetermined time segment of the plurality of predetermined time segments, wherein a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score; determine one or more recommended merchant categories and one or more recommended predetermined time segments of at least one offer that is to be communicated to the one or more users based on the prediction scores of the one or more users, wherein the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score; generate the at least one offer based on determining the one or more recommended merchant categories and the one or more recommended predetermined time segments of the at least one offer; and communicate the at least one offer to the one or more users based on generating the at least one offer.

Clause 11: The system of clause 10, wherein the at least one processor, when generating the categorical transaction model, is programmed or configured to: generate the categorical transaction model based on at least one machine learning technique.

Clause 12: The system of clauses 10 or 11, wherein the at least one offer comprises at least one of the following: a discount, a repayment plan, a redemption offer associated with a merchant, a reward parameter of a reward program associated with an issuer institution, or any combination thereof.

Clause 13: The system of any of clauses 10-12, wherein the at least one processor is further programmed or configured to: determine a set of transaction variables based on the transaction data; and wherein the at least one processor, when generating the categorical transaction model, is programmed or configured to: generate the categorical transaction model based on the set of transaction variables.

Clause 14: The system of any of clauses 10-13, wherein the set of transaction variables comprises at least one of the following: an affluence variable, a composite spending variable, a merchant category usage variable, a recent usage variable, a frequency behavior variable, or any combination thereof.

Clause 15: The system of any of clauses 10-14, wherein the at least one processor is further programmed or configured to: determine location data associated with a location of the one or more users; determining merchant identity data based on the location data associated with the location of the one or more users; and wherein communicating the at least one offer to the one or more users comprises: communicating the at least one offer to the one or more users based on the merchant identity data.

Clause 16: A computer program product for predicting payment transactions using a machine learning technique, the computer program product comprising at least one non-transitory computer-readable medium including one or more instructions that, when executed by at least one processor, cause the at least one processor to: generate a categorical transaction model based on first transaction data, wherein the transaction data is associated with a plurality of payment transactions in a plurality of merchant categories, wherein the plurality of payment transactions involve a plurality of users; determine a plurality of prediction scores for the plurality of users based on the categorical transaction model and the transaction data, wherein the one or more instructions, that cause the at least one processor to determine the plurality of prediction scores, cause the at least one processor to: determine, for each user of the plurality of users, a prediction score in a merchant category of the plurality of merchant categories for a predetermined time segment of the plurality of predetermined time segments, wherein a respective prediction score comprises a prediction of whether a respective user of the plurality of users will conduct a payment transaction in the merchant category of the plurality of merchant categories associated with the respective prediction score, at a time associated with the predetermined time segment of the plurality of predetermined time segments associated with the respective prediction score; determine a recommended merchant category and a recommended predetermined time segment of an offer that is to be communicated to a user of the plurality of users based on the prediction scores of the user, wherein the recommended merchant category and the recommended predetermined time segment of the at least one offer correspond to a merchant category and a predetermined time segment, respectively, that are determined to be associated with a prediction score for the user that satisfies a threshold prediction score; generate the offer based on determining the recommended merchant category and the recommended predetermined time segment of the offer; and communicate the offer to a user device of the user based on generating the offer.

Clause 17: The computer program product of clause 16, wherein the one or more instructions, when executed by the at least one processor, further cause the at least one processor to: determine a set of transaction variables based on the transaction data; and wherein the one or more instructions, that cause the at least one processor to generate the categorical transaction model, cause the at least one processor to: generate the categorical transaction model based on the set of transaction variables.

Clause 18: The computer program product of clauses 16 or 17, wherein the set of transaction variables comprises at least one of the following: an affluence variable, a composite spending variable, a merchant category usage variable, a recent usage variable, a frequency behavior variable, or any combination thereof.

Clause 19: The computer program product of any of clauses 16-18, wherein the threshold prediction score comprises a highest prediction score for the user in a merchant category of the plurality of merchant categories and a predetermined time segment of the plurality of predetermined time segments.

Clause 20: The computer program product of any of clauses 16-19, wherein the one or more instructions, that cause the at least one processor to generate the categorical transaction model, cause the at least one processor to: generate the categorical transaction model based on at least one machine learning technique.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
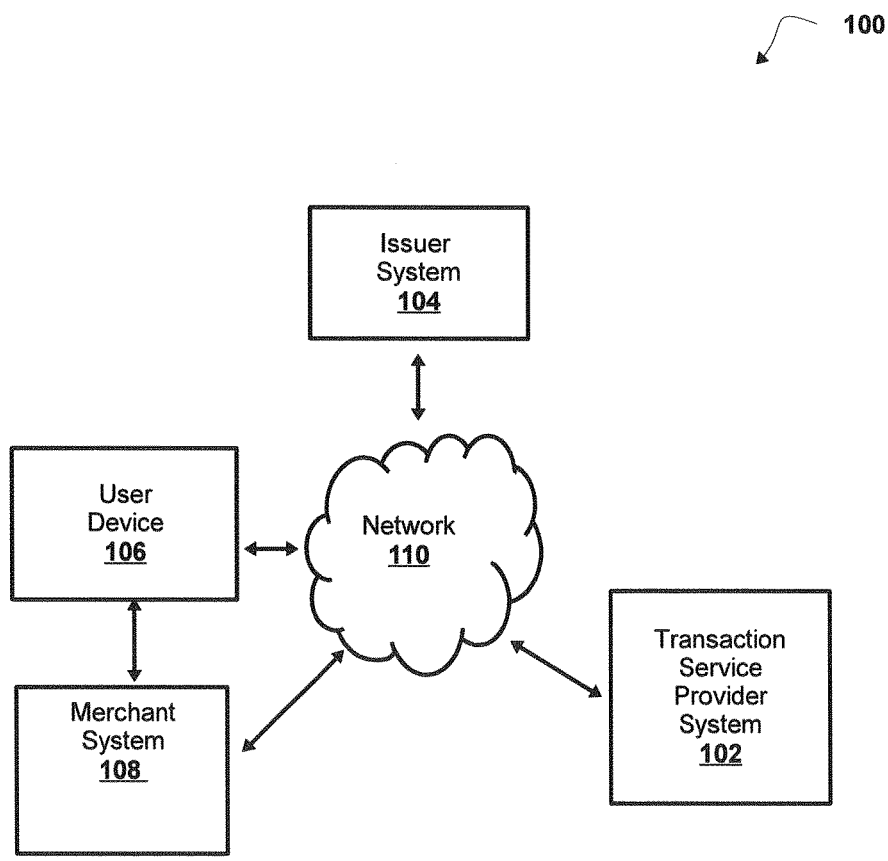
FIG. 1 is a diagram of a non-limiting embodiment of an environment in which systems, devices, products, apparatus, and/or methods, described herein, may implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least in partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, a first unit and a second unit may be in communication with each other even though the information transmitted may be modified, processed, relayed, and/or routed between the first and second units. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes. An issuer institution may be associated with a bank identification number (BIN) that uniquely identifies the issuer institution.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. Tokens may be associated with a PAN or other account identifiers in one or more data structures such that they can be used to conduct a transaction (e.g., a payment transaction) without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, a customer of the merchant, and/or the like) based on a transaction (e.g., a payment transaction). As used herein, "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, tablet computers, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the present invention are directed to systems, methods, and computer program products for predicting payment transactions using a machine learning technique. In some non-limiting embodiments, a method may include generating a categorical transaction model based on the transaction data, where the transaction data is associated with a plurality of payment transactions in a plurality of merchant categories and the plurality of payment transactions involves a plurality of users. The method may further include determining a plurality of prediction scores for one or more users of the plurality of users based on the at least one categorical transaction model and the transaction data.

In some non-limiting embodiments, determining the plurality of prediction scores may include determining, for the one or more users of the plurality of users, a prediction score in each merchant category of the plurality of merchant categories for each predetermined time segment of the plurality of predetermined time segments, where a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score.

The method may further include determining one or more recommended merchant categories and one or more recommended predetermined time segments of at least one offer that is to be communicated to the one or more users based on the prediction scores of the one or more users. In some non-limiting embodiments, the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score.

The method may further include generating the at least one offer based on determining the one or more recommended merchant categories and the one or more recommended predetermined time segments of the at least one offer and communicating the at least one offer to the one or more users based on generating the at least one offer.

In this way, embodiments of the present are effective at encouraging one or more users (e.g., a user and/or the group of users) to conduct a payment transaction in a merchant category. For example, an offer may be communicated to the one or more users based on a prediction that the one or more users may conduct a payment transaction in a particular merchant category during a predetermined time segment. In this way, embodiments of the present invention may reduce consumption of network resources and processing resources associated with communicating one or more offers to one or more users based on a prediction associated with the one or more users as compared to communicating one or more offers to the one or more users independent of a prediction. Furthermore, the one or more offers may be more accurately communicated to an appropriate user as compared to communicating one or more offers to one or more users independent of a prediction.

Referring now to FIG. 1, FIG. 1 is a diagram of a non-limiting embodiment of an environment 100 in which systems, devices, products, apparatus, and/or methods, as described herein, may be implemented. As shown in FIG. 1, environment 100 includes transaction service provider system 102, issuer system 104, user device 106, merchant system 108, and network 110.

Transaction service provider system 102 may include one or more devices capable of receiving information from and/or communicating information to issuer system 104, user device 106, and/or merchant system 108, via network 110. For example, transaction service provider system 102 may include one or more computing devices, such as a server, a group of servers, a router, a group of routers, a client device, a group of client devices, and/or the like. In some non-limiting embodiments, transaction service provider system 102 may be associated with an entity (e.g., a transaction service provider) that operates a credit card network and that processes payments for credit accounts, debit accounts, credit cards, debit cards, and/or the like.

Issuer system 104 may include one or more devices capable of receiving information from and/or communicating information to transaction service provider system 102, user device 106, and/or merchant system 108, via network 110. For example, issuer system 104 may include one or more computing devices, such as a server, a group of servers, a router, a group of routers, a client device, a group of client devices, and/or the like. In some non-limiting embodiments, the issuer system 104 may be associated with an issuer institution as described herein. In some non-limiting embodiments, issuer system 104 may be associated with an issuer institution that issued a credit account, debit account, credit card, debit card, and/or the like to a user associated with user device 106.

User device 106 may include one or more devices capable of receiving information from and/or communicating information to transaction service provider system 102, issuer system 104, and/or merchant system 108, via network 110. For example, user device 106 may include a client device, a computer device, a desktop computer, a laptop computer, a mobile device, and/or the like. In some non-limiting embodiments, a mobile device may include one or more portable electronic devices configured to communicate with one or more other electronic devices via a network (e.g., network 110). For example, a mobile device may include a cellular phone (e.g., a smartphone or standard cellular phone), a portable computer (e.g., a tablet computer, a laptop computer, and/or the like), a wearable device (e.g., a watch, pair of glasses, lens, clothing, and/or the like), a PDA, and/or other like devices.

Merchant system 108 may include one or more devices capable of receiving information from and/or communicating information to transaction service provider system 102, issuer system 104, and/or user device 106, via network 110. For example, merchant system 108 may include a computing device, such as a server, a group of servers, a router, a group of routers, a client device, a group of client devices, and/or the like. In some non-limiting embodiments, merchant system 108 may be associated with a merchant as described herein. In some non-limiting embodiments, merchant system 108 may include one or more user devices 106. For example, merchant system 108 may include user device 106 that allows a merchant associated with merchant system 108 to receive information from and/or communicate information to transaction service provider system 102.

In some non-limiting embodiments, merchant system 108 may be capable of being used by a merchant to initiate, engage in, and/or conduct a payment transaction with a user (e.g., a customer, a consumer, and/or the like) associated with user device 106. For example, merchant system 108 may include one or more computers, servers, input devices, POS devices, payment terminals, magnetic stripe card readers, chip card readers, contactless transceivers, contactless receivers, NFC receivers, RFID receivers, contact-based receivers, and/or the like.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of environment 100 may perform one or more functions described as being performed by another set of systems or another set of devices of environment 100.

Figure 2:
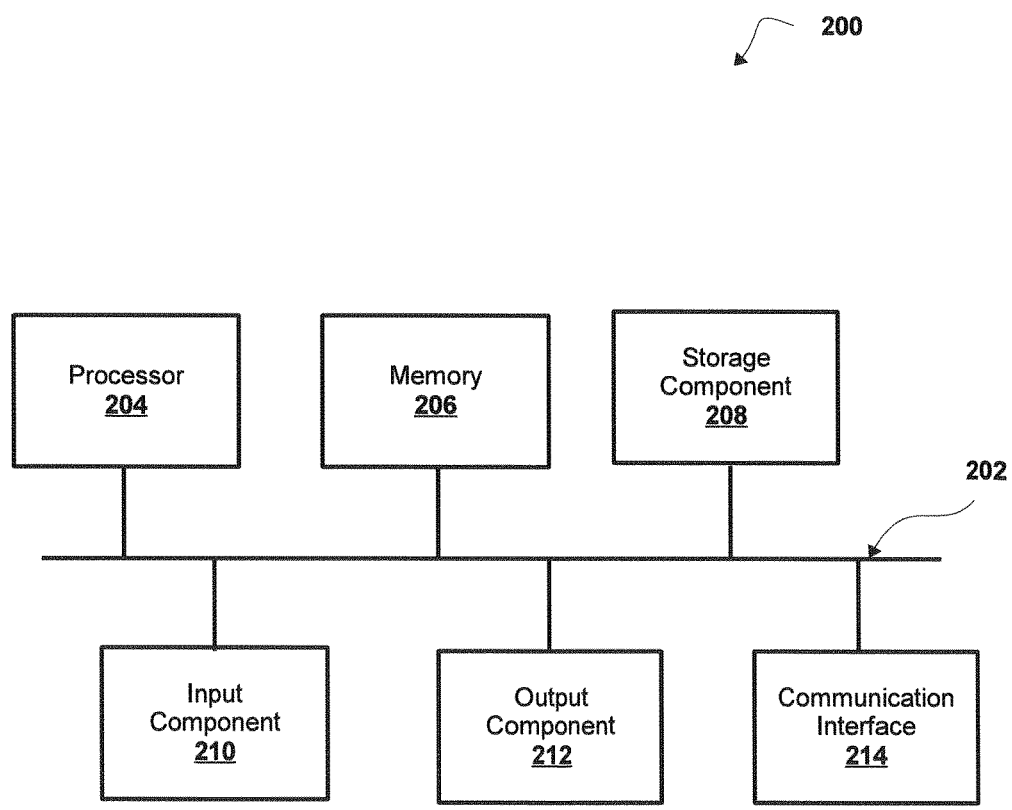
FIG. 2 is a diagram of a non-limiting embodiment of components of one or more devices of FIG. 1.

Referring now to FIG. 2, FIG. 2 is a diagram of example components of a device 200. Device 200 may correspond to transaction service provider system 102, issuer system 104, user device 106, merchant system 108, and/or one or more devices of transaction service provider system 102, issuer system 104, user device 106, and/or merchant system 108. In some non-limiting embodiments, transaction service provider system 102, issuer system 104, user device 106, and/or merchant system 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include a random access memory (RAM), a read only memory (ROM), and/or another type of dynamic or static storage device (e.g., a flash memory, a magnetic memory, an optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a separate receiver and transmitter, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
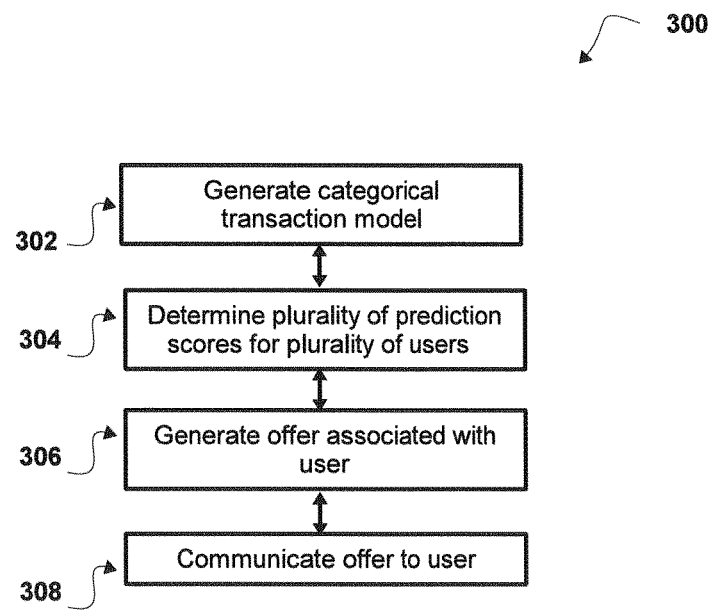
FIG. 3 is a flowchart of a non-limiting embodiment of a process for predicting payment transactions using a machine learning technique based on merchant categories and transaction time data according to the principles of the present invention.

Referring now to FIG. 3, FIG. 3 is a flowchart of a non-limiting embodiment of a process 300 for predicting payment transactions using a machine learning technique. In some non-limiting embodiments, one or more of the steps of process 300 may be performed (e.g., completely, partially, and/or the like) by transaction service provider system 102. In some non-limiting embodiments, one or more of the steps of process 300 may be performed (e.g., completely, partially, and/or the like) by another system, another device, another group of systems, or another group of devices, separate from or including transaction service provider system 102 (e.g., one or more devices of transaction service provider system 102), such as issuer system 104 (e.g., one or more devices of issuer system 104), user device 106, or merchant system 108 (e.g., one or more devices of merchant system 108).

As shown in FIG. 3, at step 302, process 300 includes generating a categorical transaction model. For example, transaction service provider system 102 may generate the categorical transaction model based on transaction data (e.g., historical transaction data, first transaction data, first historical transaction data, and/or the like) associated with one or more payment transactions. In some non-limiting embodiments, transaction service provider system 102 may receive the transaction data from issuer system 104, one or more issuer systems 104, merchant system 108, and/or one or more merchant systems 108. In some non-limiting embodiments, transaction service provider system 102 may analyze the transaction data to generate the categorical transaction model. In some non-limiting embodiments, transaction service provider system 102 may generate the categorical transaction model by generating a rule for the categorical transaction model based on transaction data (e.g., historical transaction data) associated with a payment transaction and/or a plurality of payment transactions. In some non-limiting embodiments, historical transaction data may include transaction data associated with one or more payment transactions that have been authorized, cleared, and/or settled.

In some non-limiting embodiments, the transaction data may be associated with a payment transaction (e.g., a payment transaction of a plurality of payment transactions) and/or a plurality of payment transactions. For example, the transaction data may be associated with a payment transaction involving a user and a merchant. In some non-limiting embodiments, a plurality of payment transactions may involve a plurality of users and a plurality of merchants and each payment transaction of the plurality of payment transactions may involve a user and a merchant.

In some non-limiting embodiments, the transaction data associated with a payment transaction may include transaction amount data associated with an amount of the payment transaction (e.g., a cost associated with the transaction, a transaction amount, an overall transaction amount, a cost of one or more products involved in the payment transaction, and/or the like), transaction time data associated with a time at which the payment transaction occurred (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), and/or the like.

Additionally or alternatively, the transaction data may include user transaction data associated with the user involved in the payment transaction, merchant transaction data associated with the merchant involved in the payment transaction, and/or issuer institution transaction data associated with an issuer institution of an account involved in the payment transaction. In some embodiments, user transaction data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), and/or the like.

In some embodiments, merchant transaction data may include merchant identity data associated with an identity of the merchant (e.g., a unique identifier of the merchant, a name of the merchant, and/or the like), merchant category data associated with at least one merchant category of the merchant (e.g., a code for a merchant category, a name of a merchant category, a type of a merchant category, and/or the like), merchant account data associated with an account of the merchant (e.g., an account identifier associated with an account of the merchant, a PAN associated with an account of the merchant, a token associated with an account of the merchant, and/or the like), and/or the like.

In some embodiments, issuer institution transaction data may include issuer institution identity data associated with the issuer institution that issued an account involved in the payment transaction (e.g., a unique identifier of the issuer institution, a name of the issuer institution, an issuer identification number (IIN) associated with the issuer institution, a bank identification number (BIN) associated with the issuer institution, and/or the like), and/or the like.

In some non-limiting embodiments, transaction data associated with a payment transaction (e.g., each payment transaction of a plurality of payment transactions) may identify a merchant category of a merchant involved in the payment transaction. For example, transaction data associated with the payment transaction may include merchant transaction data that identifies a merchant category of a merchant involved in the payment transaction. A merchant category may be information that is used to classify the merchant based on the type of goods or services the merchant provides. In some non-limiting embodiments, a payment transaction may involve a merchant that is associated with a merchant category of a plurality of merchant categories.

In some non-limiting embodiments, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time at which the payment transaction occurred.

In some non-limiting embodiments, the categorical transaction model may include a model designed to receive, as an input, transaction data associated with a plurality of payment transactions, and provide, as an output, a prediction as to whether a user will conduct a transaction in a merchant category of a plurality of merchant categories and in a predetermined time segment of a plurality of predetermined time segments. For example, the categorical transaction model may be designed to receive historical transaction data associated with one or more users (e.g., historical transaction data associated with payment transactions involving the one or more users), and provide an output that predicts whether the one or more users will conduct a payment transaction in a merchant category of a plurality of merchant categories and in a predetermined time segment of a plurality of predetermined time segments (e.g., within a future time period). In some non-limiting embodiments, transaction service provider system 102 may store the categorical transaction model (e.g., for later use).

In some non-limiting embodiments, transaction service provider system 102 may process the transaction data to obtain training data for the categorical transaction model. For example, transaction service provider system 102 may process the transaction data to change the transaction data into a format that may be analyzed (e.g., by transaction service provider system 102) to generate a categorical transaction model. The transaction data that is changed may be referred to as training data. In some non-limiting embodiments, transaction service provider system 102 may process the transaction data to obtain the training data based on receiving the transaction data. Additionally, or alternatively, transaction service provider system 102 may process the transaction data to obtain the training data based on transaction service provider system 102 receiving an indication that transaction service provider system 102 is to process the transaction data from a user of transaction service provider system 102, such as when transaction service provider system 102 receives an indication to create a categorical transaction model for a period of time corresponding to the transaction data.

In some non-limiting embodiments, transaction service provider system 102 may process the transaction data by determining a transaction variable based on the transaction data. A transaction variable may include a metric, associated with a payment transaction, which may be derived based on the transaction data. The transaction variable may be analyzed to generate a categorical transaction model. For example, the transaction variable may include an overall spend profile variable associated with a user involved in a payment transaction, such as an affluence variable that describes a median transaction amount of a payment transaction to indicate an affluence level of a user, a composite spending variable that describes a user's diversity of spending (e.g., based on a number of payment transactions involving the user) in terms of the user's spending in merchant categories, the user's frequency of spending in merchant categories, and/or the user's volume (e.g., a sum of transaction amounts for a plurality of payment transactions) of spending and/or the user's consistency of spending in merchant categories, and/or the like. As another example, the transaction variable may include a day and time segment variable, such as a day of the week variable that describes a day of the week that a payment transaction involving a user occurred, a time of day variable that describes a time of day that a payment transaction involving a user occurred, and/or the like. As another example, the transaction variable may include a merchant category usage variable, such as a merchant category specific usage ratio to an overall spend variable that describes a ratio of a user's spending in a merchant category compared to the user's overall spending in all merchant categories, a merchant category specific usage relative to a market average variable that describes a user's spending in a merchant category compared to other user's average spending in the merchant category, and/or the like. As another example, the transaction variable may include a recent usage variable, such as a merchant category recent usage variable that describes a period of time (e.g., a number of days) since a user last conducted a payment transaction in one or more merchant categories of a plurality of merchant categories during a predetermined time interval (e.g., 12 months), and/or the like. As another example, the transaction variable may include a frequency behavior variable, such as a usage preference variable that describes a user's spending in one or more merchant categories of a plurality of merchant categories and in one or more predetermined time segments of a plurality of predetermined time segments during a predetermined time interval (e.g., 12 months).

In some non-limiting embodiments, transaction service provider system 102 may analyze the training to generate the categorical transaction model. For example, transaction service provider system 102 may use machine learning techniques to analyze the training data to generate the categorical transaction model. In some non-limiting embodiments, generating the categorical transaction model (e.g., based on training data obtained from historical transaction data) may be referred to as training the categorical transaction model. The machine learning techniques may include, for example, supervised and/or unsupervised techniques, such as decision trees, logistic regressions, artificial neural networks, Bayesian statistics, learning automata, Hidden Markov Modeling, linear classifiers, quadratic classifiers, association rule learning, or the like. In some non-limiting embodiments, the categorical transaction model may include a model that is specific to a particular group of users, a particular group of merchants, a particular group of merchants in a predetermined geographical area, and/or the like. Additionally, or alternatively, the categorical transaction model may be specific to a particular issuer institution. In some non-limiting embodiments, transaction service provider system 102 may generate one or more categorical transaction models for one or more issuer institutions, a particular group of merchants, and/or a particular group of users.

Additionally, or alternatively, when analyzing the training data, transaction service provider system 102 may identify one or more transaction variables (e.g., one or more independent variables) as predictor variables that may be used to make a prediction (e.g., when analyzing the training data). In some non-limiting embodiments, values of the predictor variables may be inputs to the categorical transaction model. For example, transaction service provider system 102 may identify a subset (e.g., a proper subset) of the transaction variables as predictor variables that may be used to accurately predict whether a user will conduct a payment transaction in a merchant category and in a predetermined time segment. In some non-limiting embodiments, the predictor variables may include one or more of the transaction variables, as discussed above, that have a significant impact (e.g., an impact satisfying a threshold) on a probability that the user will conduct a payment transaction in a merchant category and in a predetermined time segment as determined by transaction service provider system 102.

In some non-limiting embodiments, the categorical transaction model, created by transaction service provider system 102, may be designed to receive, as an input, data associated with one or more users (e.g., transaction data associated with a plurality of payment transactions involving the one or more users), and provide, as an output, a prediction as to whether the one or more users will conduct a payment transaction in a merchant category and in a predetermined time segment. For example, the categorical transaction model may receive the input and may provide the output that includes a prediction as to whether the one or more users will conduct a payment transaction in a merchant category and a predetermined time segment within a period of time (e.g., a next 24 hours, a next three days, a next week, a next month, and/or the like). In some non-limiting embodiments, the categorical transaction model may be designed to receive, as an input, one or more transaction variables, identified as predictor variables and associated with a user, and provide, as an output, a prediction (e.g., a probability, a binary output, a yes-no output, a score, a prediction score, and/or the like) that the user will conduct a payment transaction in a merchant category and in a predetermined time segment.

In some non-limiting embodiments, transaction service provider system 102 may validate the categorical transaction model. For example, transaction service provider system 102 may validate the categorical transaction model after transaction service provider system 102 generates the categorical transaction model. In some non-limiting embodiments, transaction service provider system 102 may validate the categorical transaction model based on a portion of the training data to be used for validation. For example, transaction service provider system 102 may partition the training data into a first portion and a second portion, where the first portion may be used to generate the categorical transaction model, as described above. In this example, the second portion of the training data (e.g., the validation data) may be used to validate the categorical transaction model.

In some non-limiting embodiments, transaction service provider system 102 may validate the categorical transaction model by providing validation data associated with a user (e.g., transaction data associated with one or more payment transactions involving a user) as input to the categorical transaction model, and determining, based on an output of the categorical transaction model, whether the categorical transaction model correctly, or incorrectly, predicted that the user will conduct a payment transaction in a merchant category and in a predetermined time segment. In some non-limiting embodiments, transaction service provider system 102 may validate the categorical transaction model based on a validation threshold. For example, transaction service provider system 102 may be configured to validate the categorical transaction model when an amount of payment transactions that are conducted by the user in a merchant category and in a predetermined time segment (as identified by the validation data) are correctly predicted by the categorical transaction model (e.g., when the categorical transaction model correctly predicts 50% of the payment transactions as being conducted in a merchant category and in a predetermined time segment, 70% of the payment transactions as being conducted in a merchant category and in a predetermined time segment, a threshold quantity of the payment transactions being conducted in a merchant category and in a predetermined time segment, and/or the like).

In some non-limiting embodiments, if transaction service provider system 102 does not validate the categorical transaction model (e.g., when a percentage of correctly predicted payment transactions does not satisfy the validation threshold), then transaction service provider system 102 may generate additional categorical transaction models.

In some non-limiting embodiments, once the categorical transaction model has been validated, transaction service provider system 102 may further train the categorical transaction model and/or create new categorical transaction models based on receiving new training data. The new training data may include additional transaction data associated with one or more payment transactions. In some non-limiting embodiments, the new training data may include transaction data relating to a prediction that a user will conduct a payment transaction in a merchant category and in a predetermined time segment. For example, transaction service provider system 102 may use the categorical transaction model to predict that a user will conduct a payment transaction in a merchant category and in a predetermined time segment. In such an example, transaction service provider system 102 may have communicated an offer to the user based on the prediction, and despite communicating the offer to the user, the user did not conduct a payment transaction in the merchant category and the predetermined time segment (e.g., within a predetermined amount of time of transaction service provider system 102 communicating the offer to the user). In such an example, transaction service provider system 102 may update one or more categorical transaction models based on this new training data.

In some non-limiting embodiments, transaction service provider system 102 may store the categorical transaction model. For example, transaction service provider system 102 may store the categorical transaction model in a data structure (e.g., a database, a linked list, a tree, and/or the like). The data structure may be located within transaction service provider system 102 or external, and possibly remote from, transaction service provider system 102.

As further shown in FIG. 3, at step 304, process 300 includes determining a plurality of prediction scores for a plurality of users. For example, transaction service provider system 102 may determine a plurality of prediction scores based on the categorical transaction model and transaction data (e.g., additional historical transaction data, second transaction data, second historical transaction data, and/or the like) associated with one or more payment transactions. In some non-limiting embodiments, the transaction data used to determine the plurality of predictions scores may be the same or similar to the transaction data to generate the categorical transaction model. In some non-limiting embodiments, the transaction data used to determine the plurality of predictions scores may be associated with a plurality of payment transactions in a plurality of merchant categories conducted during a time period that is the same as or different from (e.g., before or after) the time period in which the plurality of payment transactions, which are associated with the transaction data used to generate the categorical transaction model, were conducted. In some non-limiting embodiments, transaction service provider system 102 may determine a number of prediction scores that is less than, equal to, or more than the number of merchant categories multiplied by the number of predetermined time segments. For example, if the number of merchant categories is 13 and the number of predetermined time segments is 8, the total number of predictions scores determined by transaction service provider system 102 may equal 104.

In some non-limiting embodiments, transaction service provider system 102 may receive the transaction data used to determine the plurality of prediction scores from issuer system 104, one or more issuer systems 104, merchant system 108, and/or one or more merchant systems 108 (e.g., after receiving the transaction data to generate the categorical transaction model). In some non-limiting embodiments, the transaction data used to determine the plurality of prediction scores may include transaction data associated with one or more payment transactions that have been authorized, cleared, and/or settled.

In some non-limiting embodiments, transaction service provider system 102 may determine for one or more users of the plurality of users, a prediction score in one or more merchant categories of a plurality of merchant categories and in one or more predetermined time segments of a plurality of predetermined time segments. The one or more users may be associated with a prediction score in one or more merchant categories of the plurality of merchant categories and in one or more predetermined time segments of the plurality of predetermined time segments. A prediction score (e.g., each prediction score of the plurality of prediction scores) may include a prediction of whether a user of the plurality of users will conduct a payment transaction in a merchant category of the plurality of merchant categories at a predetermined time segment of the plurality of predetermined time segments.

In some non-limiting embodiments, transaction service provider system 102 may determine, for one or more users of the plurality of users, a prediction score in one or more merchant categories of a plurality of merchant categories independent of a predetermined time segment of a plurality of predetermined time segments. For example, transaction service provider system 102 may determine, for one or more users of the plurality of users, a prediction score in one or more merchant categories of a plurality of merchant categories across all of the plurality of predetermined time segments. In such an example, one or more users may be associated with a prediction score in one or more merchant categories of the plurality of merchant categories. Further, in such an example, a prediction score may include a prediction of whether the one or more users of the plurality of users will conduct a payment transaction in a merchant category of the plurality of merchant categories independent of a predetermined time segment of the plurality of predetermined time segments. Further, in such an example, transaction service provider system 102 may determine a predetermined time segment of the plurality of predetermined time segments that corresponds to the prediction score based on determining the prediction score.

In some non-limiting embodiments, the plurality of merchant categories may be associated with goods and services that are provided by merchants. For example, the plurality of merchant categories may include a merchant category associated with food and grocery (e.g., a food and grocery merchant category), a merchant category associated with a restaurant (e.g., a restaurant merchant category), a merchant category associated with fuel (e.g., a fuel merchant category), a merchant category associated with a quick service restaurant (QSR) (e.g., a QSR merchant category), a merchant category associated with home improvement and supply (e.g., a home improvement and supply merchant category), a merchant category associated with transportation (e.g., a transportation merchant category), a merchant category associated with apparel and accessories (e.g., an apparel and accessories merchant category), a merchant category associated with entertainment (e.g., an entertainment merchant category), a merchant category associated with a discount store (e.g., a discount store merchant category), a merchant category associated with a department store (e.g., a department store merchant category), a merchant category associated with automotive (e.g., an automotive merchant category), a merchant category associated with lodging (e.g., a lodging merchant category), and/or the like.

In some non-limiting embodiments, the predetermined time segment may include a plurality of predetermined time of day segments and/or a plurality of predetermined day of a week segments. For example, the predetermined time segment may include predetermined time of day segments associated with a classification of a time interval during a day (e.g., morning (e.g., 6:00 am to 11:00 am), midday (e.g., 11:00 am to 5:00 pm), evening (e.g., 5:00 pm to 10:00 pm), night (e.g., 10:00 pm to 6:00 am), and/or the like). Additionally or alternatively, the predetermined time segment may include a predetermined day of a week segments associated with classification of a day during a week (e.g., a weekday, weekend day, a beginning of a week, Monday through Wednesday, an end of a week, Thursday through Sunday, and/or the like). In some embodiments, the predetermined time segment may include a classification of a time interval during a day and a classification of a day during a week. For example, the predetermined time segment may include a weekday morning time interval (e.g., 6:00 am to 11:00 am), a weekday midday time interval (e.g., 11:00 am to 5:00 pm), a weekday evening time interval (e.g., 5:00 pm to 10:00 pm), a weekday night time interval (e.g., 10:00 pm to 6:00 am), a weekend morning time interval (e.g., 6:00 am to 11:00 am), a weekend midday time interval (e.g., 11:00 am to 5:00 pm), a weekend evening time interval (e.g., 5:00 pm to 10:00 pm), a weekend night time interval (e.g., 10:00 pm to 6:00 am), and/or the like.

In some non-limiting embodiments, transaction service provider system 102 may determine, based on the prediction scores for one or more users of the plurality of users, a recommended merchant category for one or more predetermined time segments of the plurality of predetermined time segments. For example, transaction service provider system 102 may determine a merchant category of the plurality of merchant categories having a highest prediction score for one or more predetermined time segments of the plurality of predetermined time segments. Transaction service provider system 102 may determine that the merchant category having the highest prediction score is a recommended merchant category for the one or more predetermined time segments. In some non-limiting embodiments, the one or more users may be associated with a recommended merchant category in one or more predetermined time segments of the plurality of predetermined time segments. In some non-limiting embodiments, a recommended merchant category may indicate a prediction that a user (e.g., one or more users of the plurality of users for which a plurality of prediction scores were generated) will conduct a payment transaction in the recommended merchant category (e.g., at the predetermined time segment of the plurality of predetermined time segments for which the recommended merchant category was determined).

In some non-limiting embodiments, transaction service provider system 102 may determine, based on the prediction scores for a user, at least one additional recommended merchant category (e.g., a second recommended merchant category, a third recommended merchant category, and/or the like) for one or more predetermined time segments of the plurality of predetermined time segments. For example, transaction service provider system 102 may determine a merchant category of the plurality of merchant categories having the next highest prediction score, as compared to the merchant category having the highest prediction score, for one or more predetermined time segments of the plurality of predetermined time segments. Transaction service provider system 102 may determine that the merchant category having the next highest prediction score is the additional recommended merchant category for the one or more predetermined time segments. In some non-limiting embodiments, a user may be associated with a recommended merchant category and at least one additional recommended merchant category in one or more predetermined time segments of the plurality of predetermined time segments.

In some non-limiting embodiments, transaction service provider system 102 may determine for a user (e.g., one or more users of the plurality of users), a prediction score in each merchant category of 13 merchant categories and in each predetermined time segment of 8 predetermined time segments. For example, transaction service provider system 102 may determine the prediction score that a user may conduct a payment transaction in each merchant category of 13 merchant categories during each predetermined time segment of 8 predetermined time segments. In such an example, transaction service provider system 102 may determine, based on the prediction score, a recommended merchant category for each predetermined time segment of the plurality of predetermined time segments. Further, in such an example, transaction service provider system 102 may determine, for a user (e.g., each user of the plurality of users), the recommended merchant category for each predetermined time segment of the plurality of predetermined time segments as illustrated in Table 1 and Table 2:

TABLE 1

| | |
|---|---|
| Night: Recommended Merchant Category = Transportation Merchant Category | Morning: Recommended Merchant Category = Fuel Merchant Category |
| Evening: Recommended Merchant Category = Food and Grocery Merchant Category | Mid day: Recommended Merchant Category = Restaurant Merchant Category |

For User: Predetermined Time Segment = Weekday

TABLE 2

| | |
|---|---|
| Night: Recommended Merchant Category = Restaurant Merchant Category | Morning: Recommended Merchant Category = Fuel Merchant Category |
| Evening: Recommended Merchant Category = Entertainment Merchant Category | Mid day: Recommended Merchant Category = Food and Grocery Merchant Category |

For User: Predetermined Time Segment = Weekend

As further shown in FIG. 3, at step 306, process 300 includes generating an offer associated with one or more users. For example, transaction service provider system 102 may generate an offer associated with a user (e.g., a user of the plurality of users for which a prediction score was generated) or a plurality of offers associated with the user. In some non-limiting embodiments, transaction service provider system 102 may determine a merchant category and a predetermined time segment of one or more offers that are to be communicated to a user. For example, transaction service provider system 102 may determine, for a user, a recommended merchant category for one or more predetermined time segments of the plurality of predetermined time segments based on the highest prediction score in each merchant category of the plurality of merchant categories. Transaction service provider system 102 may generate one or more offers where the one or more offers include an offer for the recommended merchant category for one or more predetermined time segments of the plurality of predetermined time segments. In such an example, transaction service provider system 102 may generate a number of offers equal to the number of predetermined time segments. In some non-limiting embodiments, transaction service provider system 102 may generate at least one offer associated with the user, where the at least one offer includes an offer for the recommended merchant category and at least one additional recommended merchant category for one or more predetermined time segments of the plurality of predetermined time segments.

In some non-limiting embodiments, the offer may include a discount (e.g., a coupon, a monetary discount, and/or the like) to be applied to a payment transaction, a rewards parameter associated with a rewards program (e.g., a rewards program associated with an issuer institution, a rewards program associated with a merchant with a merchant category that corresponds to the merchant category of the offer, a loyalty program associated with an issuer institution, a loyalty program associated with a merchant, and/or the like), a redemption offer associated with a merchant with a merchant category that corresponds to the merchant category of the offer (e.g., an offer associated with a user receiving a good or a service from the merchant when the user conducts a payment transaction involving the merchant), a repayment plan associated with a payment transaction, and/or the like.

In some non-limiting embodiments, transaction service provider system 102 may generate an offer associated with one or more users based on determining whether one or more prediction scores of the one or more users in one or more merchant categories satisfy a threshold (e.g., a threshold prediction score). For example, transaction service provider system 102 may generate an offer associated with a user based on determining that the prediction score of the user in one or more merchant categories (e.g., independent of a predetermined time segment, across all predetermined time segments) satisfies a threshold prediction score (e.g., a highest prediction score of the user in all merchant categories) for the user. In such an example, transaction service provider system 102 may generate an offer corresponding to the one or more merchant categories determined to be associated with the prediction score that satisfies the threshold prediction score.

In some non-limiting embodiments, transaction service provider system 102 may generate an offer associated with one or more users based on determining whether one or more prediction scores of the one or more users in one or more merchant categories and predetermined time segments satisfy a threshold (e.g., a threshold prediction score). For example, transaction service provider system 102 may generate an offer associated with a user based on determining that the prediction score of the user in one or more merchant categories and predetermined time segments satisfies a threshold prediction score (e.g., a highest prediction score of the user in all merchant categories) for the user. In such an example, transaction service provider system 102 may generate an offer corresponding to the one or more merchant categories and predetermined time segments determined to be associated with the prediction score that satisfies the threshold prediction score.

In some non-limiting embodiments, transaction service provider system 102 may generate an offer associated with one or more users based on determining whether a prediction score of each of the one or more users, of a plurality of users in a merchant category, satisfies a threshold prediction score (e.g., a percentage of users with the highest prediction score, 10% of the users with the highest prediction score, 15% of the users with the highest prediction score, and/or the like). For example, transaction service provider system 102 may generate an offer associated with a user based on determining that the user has a prediction score in a merchant category (e.g., independent of a predetermined time segment, across all predetermined time segments) that is within 10% of the highest prediction scores among a plurality of users in the merchant category. In such an example, transaction service provider system 102 may generate an offer corresponding to the merchant categories determined to be associated with the prediction score that satisfies the threshold prediction score.

In some non-limiting embodiments, transaction service provider system 102 may generate an offer associated with one or more users based on determining whether a prediction score of each of the one or more users, of a plurality of users in a merchant category and predetermined time segment, satisfies a threshold prediction score (e.g., a percentage of users with the highest prediction score, 10% of the users with the highest prediction score, 15% of the users with the highest prediction score, and/or the like). For example, transaction service provider system 102 may generate an offer associated with a user based on determining that the user has a prediction score in a merchant category and a predetermined time segment that is within 10% of the highest prediction scores among a plurality of users in the merchant category and the predetermined time segment. In such an example, transaction service provider system 102 may generate an offer associated with the one or more users corresponding to the merchant category and the predetermined time segment determined to be associated with the prediction score of the one or more users that satisfies the threshold prediction score.

As further shown in FIG. 3, at step 308, process 300 includes communicating one or more offers to the user. For example, transaction service provider system 102 may communicate one or more offers to the user (e.g., the user associated with user device 106). In some non-limiting embodiments, transaction service provider system 102 may communicate one or more offers to the user based on generating the one or more offers. In some non-limiting embodiments, transaction service provider system 102 may communicate one or more offers to the user at a time of day and/or a day of a week corresponding to a predetermined time segment of the one or more offers.

In some non-limiting embodiments, transaction service provider system 102 may determine a location (e.g., a current location, a home address, a zip code, a geographical area, and/or the like) of the user. For example, transaction service provider system 102 may determine location data associated with the location of the user based on an online search, based on location data received from an application (e.g., a mobile application stored on user device 106, and/or the like), based on transaction data associated with one or more payment transaction involving the user, and/or the like. Transaction service provider system 102 may determine the location of the user based on the location data. In some non-limiting embodiments, transaction service provider system 102 may determine merchant identity data based on the location of the user. For example, transaction service provider system 102 may determine merchant identity data associated with one or more merchants that are located with a predetermined distance of the location of the user. In some non-limiting embodiments, transaction service provider system 102 may communicate the one or more offers to the user based on the merchant identity data. For example, transaction service provider system 102 may communicate one or more offers to the user based on the merchant identity data, where the one or more offers include an offer associated with the one or more merchants that are located within the predetermined distance of the location of the user.

Figure 4A:
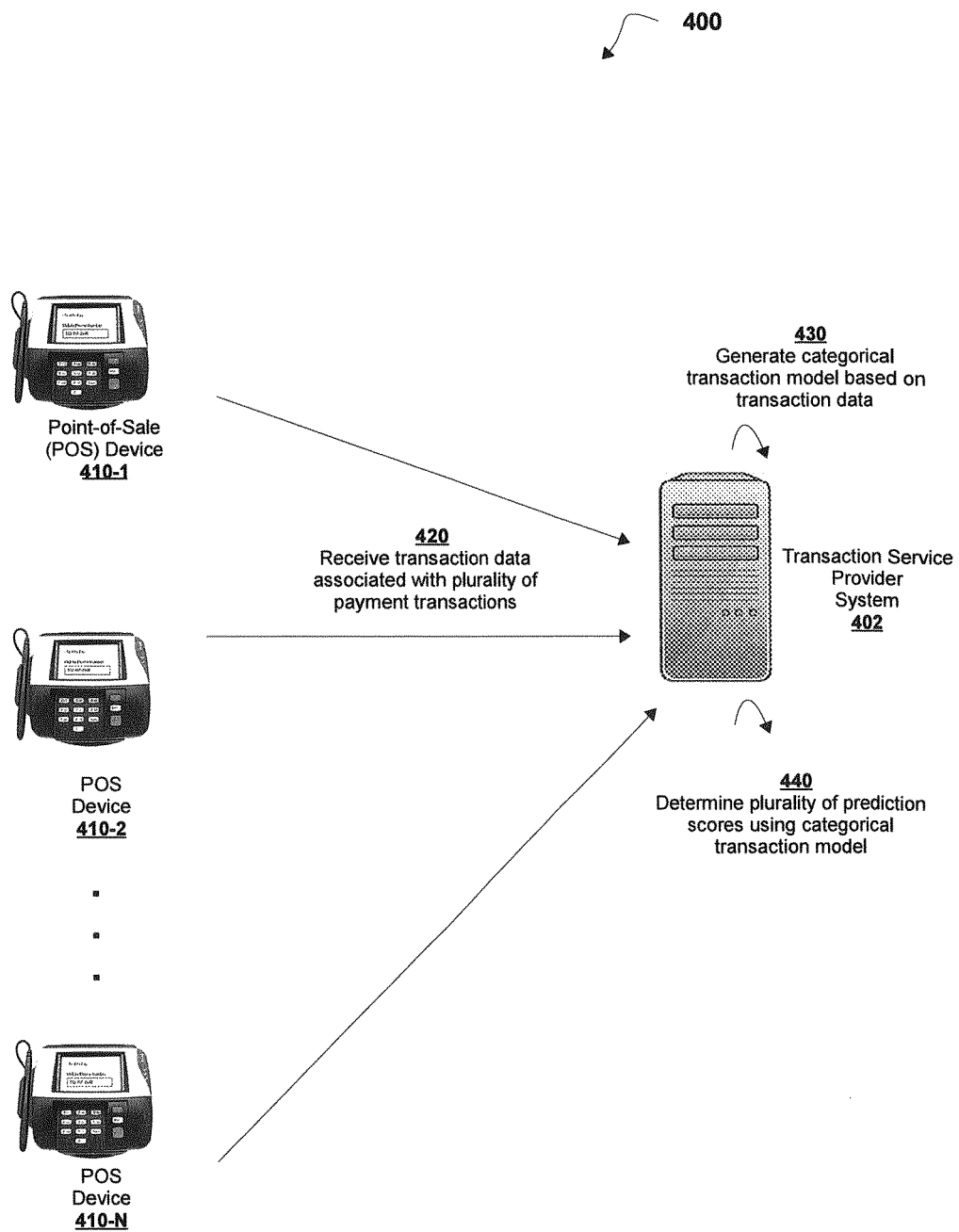
FIGS. 4A-4B are diagrams of an implementation of a non-limiting embodiment of the process shown in FIG. 3.
Figure 4B:
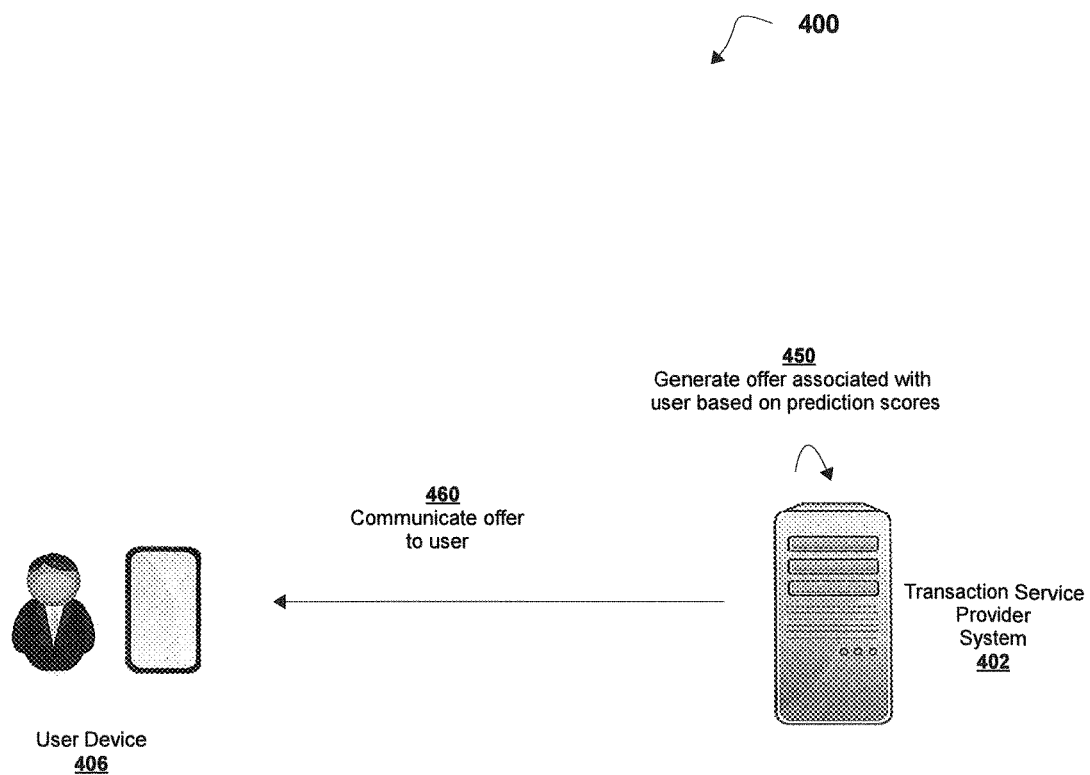

FIGS. 4A and 4B are diagrams of an overview of a non-limiting embodiment of implementation 400 relating to process 300 shown in FIG. 3. As shown in FIGS. 4A and 4B, implementation 400 may include transaction service provider system 402, user device 406, and one or more POS devices 410-1 through 410-N. As referred to herein, one or more of POS devices 410-1 through 410-N may perform the same or similar functions as a POS device described above. Accordingly, POS devices 410-1 through 410-N may be collectively referred to as "POS devices 410". In some non-limiting embodiments, POS devices 410 may be associated with (e.g., components of) one or more merchant systems 108. In some non-limiting embodiments, transaction service provider system 402 may be the same or similar to transaction service provider system 102, and user device 406, may be the same as or similar to user device 106 as described above.

As shown by reference number 420 in FIG. 4A, transaction service provider system 402 may receive transaction data from POS devices 410, where the transaction data (e.g., transaction data as described above) is associated with a plurality of payment transactions involving a plurality of users. As further shown by reference number 430 in FIG. 4A, transaction service provider system 402 may generate a categorical transaction model based on the transaction data. For example, transaction service provider system 402 may generate the categorical transaction model as described above with regard to FIG. 3. As further shown by reference number 440 in FIG. 4A, transaction service provider system 402 may determine a plurality of prediction scores for a plurality of users using the categorical transaction model. In some non-limiting embodiments, transaction service provider system 402 may determine the plurality of predictions scores based on the categorical transaction model and the transaction data. For example, transaction service provider system 402 may determine the plurality of prediction scores as described above with regard to FIG. 3.

As shown by reference number 450 in FIG. 4B, transaction service provider system 402 may generate at least one offer associated with a user (e.g., a user of the plurality of users involved in the plurality of payment transactions). For example, transaction service provider system 402 may generate the at least one offer as described above with regard to FIG. 3. As further shown by reference number 460 in FIG. 4B, transaction service provider system 402 may communicate the at least one offer to the user associated with user device 406. For example, transaction service provider system 402 may communicate the at least one offer as described above with regard to FIG. 3.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for predicting payment transactions using a machine learning technique, the method comprising:
receiving, with at least one processor, transaction data, wherein the transaction data is associated with a plurality of payment transactions in a plurality of merchant categories, wherein the plurality of payment transactions involve a plurality of users;
generating, with at least one processor, a categorical transaction model based on the transaction data; and
determining, with at least one processor, a plurality of prediction scores for one or more users of the plurality of users based on the at least one categorical transaction model and the transaction data, wherein determining the plurality of prediction scores comprises:
determining, for the one or more users of the plurality of users, a prediction score in each merchant category of the plurality of merchant categories for each predetermined time segment of a plurality of predetermined time segments, wherein a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score, and
determining, with at least one processor, one or more recommended merchant categories and one or more recommended predetermined time segments of at least one offer that is to be communicated to the one or more users based on the prediction scores of the one or more users, wherein the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score;
generating, with at least one processor, the at least one offer based on determining the one or more recommended merchant categories and the one or more recommended predetermined time segments of the at least one offer; and
communicating, with at least one processor, the at least one offer to the one or more users based on generating the at least one offer.

2. The computer-implemented method of claim 1, wherein the plurality of merchant categories comprises at least one of the following:
a food and grocery merchant category,
a restaurant merchant category,
a fuel merchant category, or
any combination thereof.

3. The computer-implemented method of claim 1, wherein the predetermined time segment comprises at least one of the following:
a predetermined time of day segment,
a predetermined day of a week segment, or
any combination thereof.

4. The computer-implemented method of claim 1, wherein the predetermined time segment comprises a predetermined time of day segment, and wherein the predetermined time of day segment is a predetermined time of day segment of a plurality of predetermined time of day segments, wherein the predetermined day of a week segment is a predetermined day of a week segment of a plurality of predetermined day of a week segments, wherein the plurality of predetermined time of day segments comprises at least four time of day segments and wherein the plurality of predetermined day of the week segments comprises at least two predetermined day of the week segments.

5. The computer-implemented method of claim 1, further comprising:
determining location data associated with a location of the one or more users; and
determining merchant identity data based on the location data associated with the location of the one or more users,
wherein communicating the at least one offer to the one or more users comprises:
communicating the at least one offer to the one or more users based on the merchant identity data.

6. The computer-implemented method of claim 1, wherein communicating the at least one offer to the one or more users comprises:
communicating the at least one offer to the one or more users at the time associated with the at least one predetermined time segment.

7. The computer-implemented method of claim 1, wherein the threshold prediction score comprises a highest prediction score for the one or more users in the one or more merchant categories of the plurality of merchant categories and the one or more predetermined time segments of the plurality of predetermined time segments.

8. The computer-implemented method of claim 1, wherein the threshold prediction score comprises 10% percent of a plurality of highest prediction scores for the plurality of users in the one or more merchant categories of the plurality of merchant categories and the one or more predetermined time segments of the plurality of predetermined time segments.

9. The computer-implemented method of claim 1, wherein the plurality of payment transactions comprises a plurality of card present payment transactions.

10. A system for predicting payment transactions using a machine learning technique, the system comprising:
at least one processor programmed or configured to:
generate a categorical transaction model based on first transaction data, wherein the first transaction data is associated with a first plurality of payment transactions in a plurality of merchant categories, wherein the first plurality of payment transactions involves a plurality of users;
determine a plurality of prediction scores for one or more users of the plurality of users based on at least one categorical transaction model and second transaction data, wherein the second transaction data is associated with a second plurality of payment transactions in the plurality of merchant categories, and wherein the at least one processor, when determining the plurality of prediction scores, is programmed or configured to:
  determine, for the one or more users of the plurality of users, a prediction score in each merchant category of the plurality of merchant categories for each predetermined time segment of a plurality of predetermined time segments, wherein a respective prediction score comprises a prediction of whether the one or more users will conduct a payment transaction in a merchant category of the plurality of merchant categories associated with the respective prediction score, at a time associated with a predetermined time segment of the plurality of predetermined time segments associated with the respective prediction score, and
  determine one or more recommended merchant categories and one or more recommended predetermined time segments of at least one offer that is to be communicated to the one or more users based on the prediction scores of the one or more users, wherein the one or more recommended merchant categories and the one or more recommended predetermined time segments of the at least one offer correspond to a merchant category and a predetermined time segment, respectively, that are determined to be associated with a prediction score for the one or more users that satisfies a threshold prediction score;
  generate the at least one offer based on determining the one or more recommended merchant categories and the one or more recommended predetermined time segments of the at least one offer; and
  communicate the at least one offer to the one or more users based on generating the at least one offer.

11. The system of claim 10, wherein the at least one processor, when generating the categorical transaction model, is programmed or configured to:
  generate the categorical transaction model based on at least one machine learning technique.

12. The system of claim 10, wherein the at least one offer comprises at least one of the following:
  a discount,
  a repayment plan,
  a redemption offer associated with a merchant,
  a reward parameter of a reward program associated with an issuer institution, or
  any combination thereof.

13. The system of claim 10, wherein the at least one processor is further programmed or configured to:
  determine a set of transaction variables based on the transaction data,
  wherein the at least one processor, when generating the categorical transaction model, is programmed or configured to:
    generate the categorical transaction model based on the set of transaction variables.

14. The system of claim 13, wherein the set of transaction variables comprises at least one of the following:
  an affluence variable,
  a composite spending variable,
  a merchant category usage variable,
  a recent usage variable,
  a frequency behavior variable, or
  any combination thereof.

15. The system of claim 10, wherein the at least one processor is further programmed or configured to:
  determine location data associated with a location of the one or more users; and
  determine merchant identity data based on the location data associated with the location of the one or more users,
  wherein communicating the at least one offer to the one or more users comprises:
    communicating the at least one offer to the one or more users based on the merchant identity data.

16. A computer program product for predicting payment transactions using a machine learning technique, the computer program product comprising at least one non-transitory computer-readable medium including one or more instructions that, when executed by at least one processor, cause the at least one processor to:
  generate a categorical transaction model based on first transaction data, wherein the transaction data is associated with a plurality of payment transactions in a plurality of merchant categories, wherein the plurality of payment transactions involves a plurality of users;
  determine a plurality of prediction scores for the plurality of users based on the categorical transaction model and the transaction data, wherein the one or more instructions, that cause the at least one processor to determine the plurality of prediction scores, cause the at least one processor to:
    determine, for each user of the plurality of users, a prediction score in a merchant category of the plurality of merchant categories for a predetermined time segment of a plurality of predetermined time segments, wherein a respective prediction score comprises a prediction of whether a respective user of the plurality of users will conduct a payment transaction in the merchant category of the plurality of merchant categories associated with the respective prediction score, at a time associated with the predetermined time segment of the plurality of predetermined time segments associated with the respective prediction score, and
    determine a recommended merchant category and a recommended predetermined time segment of an offer that is to be communicated to a user of the plurality of users based on the prediction scores of the user, wherein the recommended merchant category and the recommended predetermined time segment of at least one offer correspond to a merchant category and a predetermined time segment, respectively, that are determined to be associated with a prediction score for the user that satisfies a threshold prediction score;
  generate the at least one offer based on determining the recommended merchant category and the recommended predetermined time segment of the at least one offer; and
  communicate the at least one offer to a user device of the user based on generating the at least one offer.

17. The computer program product of claim 16, wherein the one or more instructions, when executed by the at least one processor, further cause the at least one processor to:
  determine a set of transaction variables based on the transaction data,
  wherein the one or more instructions, that cause the at least one processor to generate the categorical transaction model, cause the at least one processor to:
    generate the categorical transaction model based on the set of transaction variables.

18. The computer program product of claim 17, wherein the set of transaction variables comprises at least one of the following:
- an affluence variable,
- a composite spending variable,
- a merchant category usage variable,
- a recent usage variable,
- a frequency behavior variable, or
- any combination thereof.

19. The computer program product of claim 16, wherein the threshold prediction score comprises a highest prediction score for the user in a merchant category of the plurality of merchant categories and a predetermined time segment of the plurality of predetermined time segments.

20. The computer program product of claim 16, wherein the one or more instructions, that cause the at least one processor to generate the categorical transaction model, cause the at least one processor to:
- generate the categorical transaction model based on at least one machine learning technique.

* * * * *